US008756094B2

(12) United States Patent
Keinan (10) Patent No.: US 8,756,094 B2
(45) Date of Patent: Jun. 17, 2014

(54) RISK MITIGATION FOR COMPUTER SYSTEM CHANGE REQUESTS

(75) Inventor: Benny Keinan, Rehovot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1336 days.

(21) Appl. No.: 12/359,853

(22) Filed: Jan. 26, 2009

(65) Prior Publication Data

US 2010/0191952 A1    Jul. 29, 2010

(51) Int. Cl.
*G06Q 10/00* (2012.01)
(52) U.S. Cl.
USPC .......................................... 705/7.28; 705/301
(58) Field of Classification Search
USPC .................................... 705/7.27, 7.28, 301
See application file for complete search history.

(56) References Cited

U.S. PATENT DOCUMENTS

| 5,032,789 | A | 7/1991 | Firooz et al. |
| 5,581,463 | A | 12/1996 | Constant et al. |
| 7,213,170 | B2 | 5/2007 | Shidla et al. |
| 7,278,163 | B2 * | 10/2007 | Banzhof et al. ................. 726/25 |
| 7,392,149 | B2 | 6/2008 | Bonilla |
| 7,496,964 | B2 * | 2/2009 | Renfro et al. .................... 726/25 |
| 8,046,755 | B2 * | 10/2011 | Gaa-Frost et al. ............ 717/177 |
| 8,156,063 | B1 * | 4/2012 | Rahmouni et al. ............. 706/45 |
| 2005/0188289 | A1 | 8/2005 | Berndlmaier et al. |
| 2006/0080656 | A1 * | 4/2006 | Cain et al. ..................... 717/174 |
| 2006/0161883 | A1 | 7/2006 | Lubrecht et al. |
| 2006/0161884 | A1 | 7/2006 | Lubrecht et al. |

* cited by examiner

*Primary Examiner* — Mark A Fleischer (57) ABSTRACT

Implementation of change requests involves risk for computer systems. Methods of mitigating such risk, and apparatus to perform the methods, include comparing levels of risk of risk factors of a change request to corresponding risk factors of one or more prior change requests, and suggesting alternative factor values to lower an expected level of risk.

6 Claims, 5 Drawing Sheets

RISK MITIGATION FOR COMPUTER SYSTEM CHANGE REQUESTS

BACKGROUND

Computer systems are routinely modified, either through maintenance, upgrade, addition or deletion. A change request is a request to add, remove or modify one or more items in the organization's information technology (IT) structure, e.g., replace a hard drive in a server, upgrade the version of a specific software application or install a new software application.

Change request implementations generally have some impact on the stability of the organization's IT. Thus, change implementation can often cause part of the system to malfunction. IT organizations typically try to minimize the impact of the change request implementation by reviewing the change request and approving it only after they understand its impact and risk. There are several areas where review boards can reduce the risk, but due to large number of change requests being reviewed, these review boards are often not capable of effectively reducing the risk and generally they only understand the potential impact of the change request. As a result, change requests are often implemented outside their optimal conditions and the damage to the organization is higher than one might expect.

For the reasons stated above, and for other reasons that will become apparent to those skilled in the art upon reading and understanding the present specification, there is a need in the art for alternative methods and apparatus for implementing change requests in computer systems.

DETAILED DESCRIPTION

In the following detailed description of the present embodiments, reference is made to the accompanying drawings that form a part hereof, and in which is shown by way of illustration specific embodiments of the disclosure which may be practiced. These embodiments are described in sufficient detail to enable those skilled in the art to practice the subject matter of the disclosure, and it is to be understood that other embodiments may be utilized and that process or mechanical changes may be made without departing from the scope of the present disclosure. The following detailed description is, therefore, not to be taken in a limiting sense, and the scope of the present disclosure is defined by the appended claims and equivalents thereof.

The various embodiments include methods for mitigating risk in change request implementation for computer systems, and apparatus for performing the methods. In prior solutions, one approach is to hold a meeting among the relevant people to the planned change requests and to discuss each of the changes, e.g., a Change Advisory Board (CAB). While these people may have all the information needed to reduce the risk level of the change request, this process is generally time consuming and organizations typically only talk about the most obvious issues and are not able to cover most of the change requests. For example, it may not be uncommon for a large organization to review only 5% of the change requests in this manner.

Another attempt to solve this problem is by using software applications such as HP Release Control software available from Hewlett-Packard Company, Palo Alto, Calif., USA. HP Release Control (formerly HP Change Control Management) is a decision-support solution that ties the change planning and analysis process with automated change execution and validation to help reduce the risk of service downtime. This software increases visibility with a consolidated view into all change activity, both Information Technology Infrastructure Library-based (ITIL-based) and ad-hoc, automating impact analysis, risk assessment and collision detection. This provides more accurate planning and approval decisions during the review process, as well as real-time visibility and cross-team communication to mitigate service disruptions that occur due to unplanned changes, schedule delays, collisions or failures during change execution. By coordinating hand-offs and sharing information between the CAB and the implementation team, such as execution outcome, actual deployment time, and rationale behind each change decision, visibility is increased to provide better context for the implementer, facilitate post implementation review and enable more accurate future analysis, planning and time spent on the change review process.

Various embodiments disclosed herein build upon risk assessment applications, such as found in the HP Release Control software, by providing recommended modifications to the change requests to produce an expected reduction in risk involved in implementation. That is, various embodiments disclosed herein evaluate modifications to a change request, such as a change in implementer or team of implementers, a change in scheduling, a change in implementation hardware, etc. By comparing the assessed risk of various alternatives to achieve the goal of a change request, a revised change request can be recommended that is expected to have a greater chance of success, i.e., a mitigated risk, over the original change request. Such recommendations may be automated within the computer system, or they may be performed manually at the request of a user.

Figure 1:
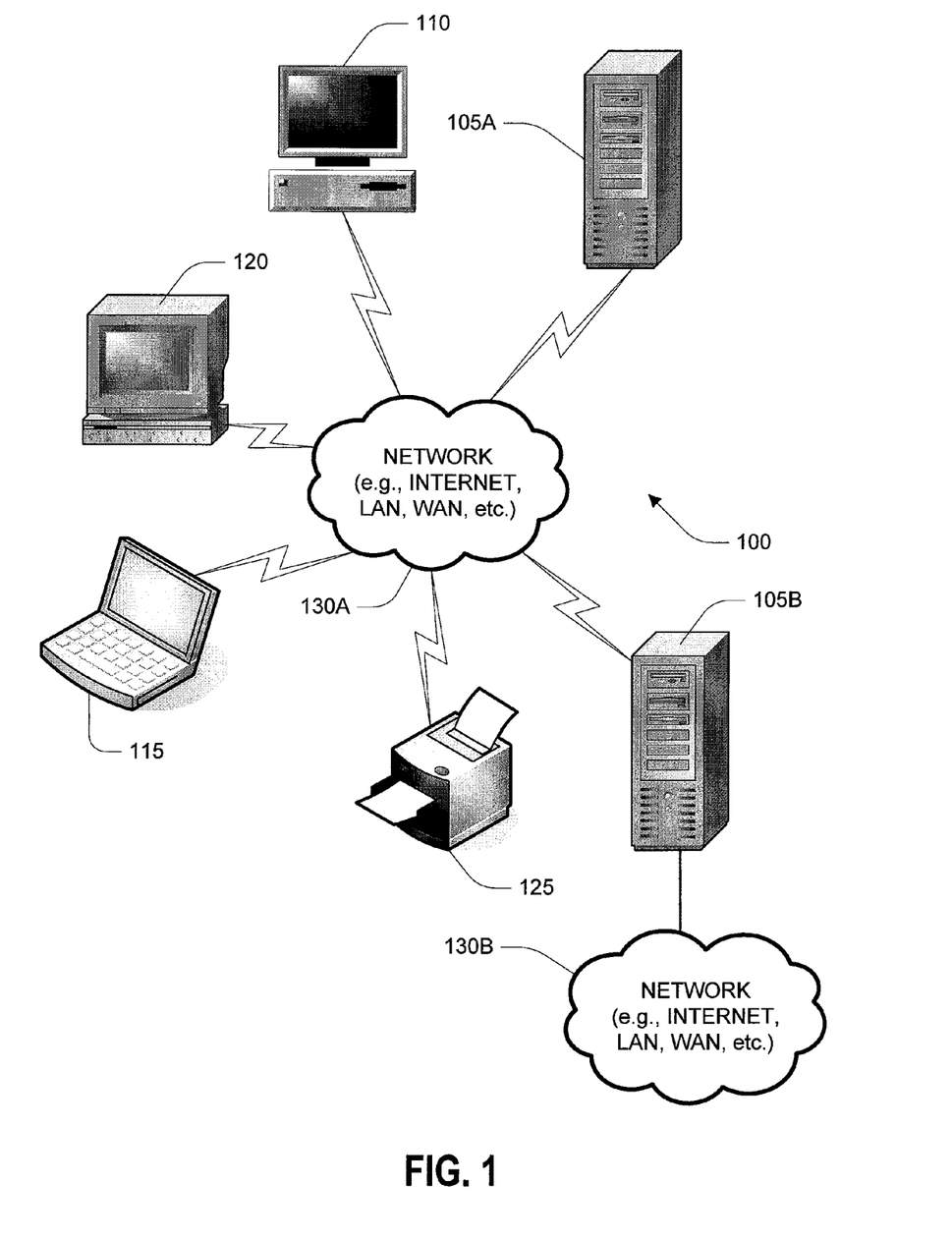
FIG. 1 is a representation of a computer system for use with various embodiments of the disclosure.

FIG. 1 is a representation of a computer system 100 for use with various embodiments of the disclosure. The computer system 100 may include one or more computing devices, such as servers 105A/B, personal computer 110 and portable computer 115. The computer system 100 may also include one or more peripheral devices, such as terminal 120 and printer 125. The devices of computer system 100 may be in communication with each other through one or more networks, such as network 130A. Network 130A may include the Internet, local area networks (LANs), wide area networks (WANs), etc., or a combination of the like. In addition, one or more of the devices, such as server 105B, may be in communication with more than one network, such as network 130B.

Those familiar with computer systems will recognize that alternative, fewer and/or additional computing and peripheral devices (not shown) can also be included in computer system 100, such as personal digital assistants (PDAs), scanners, storage devices, sensors, gateways, routers, etc., and that alternative network configurations are also contemplated. Therefore, the computer system 100 of FIG. 1 is merely intended to be a representation of one example computer system and it will be clear upon reading this disclosure that the various embodiments are adaptable to a wide variety of computer systems. In general, a computer system for used with the various embodiments includes at least one computing device. A change request as used herein is a request to add, remove or modify at least one software application, hardware component or device of a computer system.

Although the various embodiments will be described with reference to the use of HP Release Control software, the various embodiments may be implemented with any algorithm or process capable of assessing a risk level associated with a change request and/or identifying similar change requests. However, to aid in the understanding of the various embodiments, some background will be provided with respect to HP Release Control.

In general, HP Release Control performs risk assessment on each change request, enabling change managers to compare change requests in terms of the risks involved in their implementation. The risk calculation does not reflect an objective, universal risk level. Rather, it indicates a quantitative level of risk of the selected change request relative to the other change requests.

In HP Release Control, Probability of Failure represents the probability that the implementation of the change request will fail to some degree and cause possible damage as a result. Probability of Failure is calculated as a weighted value between 0 and 10, with a higher number indicating a higher probability of failure.

Probability of Failure is calculated based on risk factors that are defined by a user during a configuration process. For example, the user could define a Probability of Failure risk factor called technology-experience, which reflects the amount of time that the technology involved in the change request has been used in the organization. As part of creating a new risk factor, the user defines the source of the data (e.g., a field in the integrated service desk application), defines mapping rules that translate the source data into factor values between 0 and 10, and assigns a weight to the factor.

Continuing with this example, the user may assign the mapping roles for the technology-experience risk factor as provided in Table 1. Such mapping rules translate the source data into factor values between 0 and 10. For the example provided in Table 1, if the technology was introduced 18 months ago, the technology-experience risk factor would receive a score of 5.

TABLE 1

| Original Data (in months) | Factor Value |
|---|---|
| 1-12 | 10 |
| 12-24 | 5 |
| 24-36 | 0 |

The user might assign a weight of 4 to the technology-experience risk factor. The user, in this example, then defines three more risk factors to measure Probability of Failure. Table 2 summarizes the Probability of Failure risk factors defined by the user and their assigned weights for this example.

TABLE 2

| Factor Name | Weight |
|---|---|
| technology-experience | 4 |
| QA-approval | 8 |
| num-of-CCIs | 6 |
| planned-duration | 2 |
| Total Weight = 20 | |

Continuing with this example, assume that a particular change request involving a fairly new technology is processed by HP Release Control and receives the Probability of Failure risk factor scores as provided in Table 3.

TABLE 3

| Factor Name | Factor Value |
|---|---|
| technology-experience | 10 |
| QA-approval | 4 |
| num-of-CCIs | 2 |
| planned-duration | 0 |

HP Release Control calculates a weighted value for each factor using the formula Weight/Total Weight×Factor Value=Weighted Value, where Weight is the weight assigned to the risk factor during the HP Release Control configuration process, Total Weight is the sum of all the weights assigned the risk factors and Factor Value is the score of the risk factor as translated from the source data. The mapping used to translate source data into a score is defined during the HP Release Control configuration process. Substituting the values for the technology-experience risk factor (Weight=4, Total Weight=20, Factor Value=10) into this formula, you arrive at a weighted value of 2.

Weighted values may then be calculated for all the Probability of Failure risk factors as illustrated in Table 4. The Probability of Failure score is the sum of all the weighted values and amounts to 4.2 in the foregoing example. The Probability of Failure represents a composite level of risk for the change request.

TABLE 3

| Factor Name | Factor Value | Weight | Weighted Value |
|---|---|---|---|
| technology-experience | 10 | 4 | 2 |
| QA-approval | 4 | 8 | 1.6 |
| num-of-CCIs | 2 | 6 | 0.6 |
| planned-duration | 0 | 2 | 0 |
| | | Total Weight = 20 | Probability of Failure = 4.2 |

As noted above, the various embodiments are not dependent upon the use of HP Release Control software or its method of assessing risk. This was but one example of how the risk assessment might be performed. Any method that is capable of assigning a quantitative level of risk to a given risk factor would be suitable for embodiments disclosed herein. For example, historical success rates for each factor value of a risk factor may be used as the quantitative level of risk for that risk factor.

Because the various embodiments compare risk for a given risk factor between the factor value of an original change request and one or more alternative values, there may be advantages to only evaluating alternative values for similar change requests. As an example, if the risk factor of interest is the identity of the implementer, and the change request is for installation of a software upgrade, it may be desirable to only evaluate the risk of alternative implementers based on their success rate at software upgrades, while ignoring their success rates of installing new hardware.

HP Release Control software also provides a capability to identify similar change requests. HP Release Control automatically identifies and compares elements which are common to all change requests, and generates a list of existing changes which are found to be similar to any proposed change request. The similarity analysis can be adaptive such that a user can affirm or reject change requests identified as being similar, which can then be used to tune the similarity analysis to become more accurate in the view of the user. Although not essential to the embodiments disclosed herein, a more detailed description of an adaptive similarity analysis can be found in U.S. patent application Ser. No. 12/240,593. Alternatively, historical data regarding prior change requests can simply be grouped into categories, e.g., software upgrade, software installation, hardware upgrade, etc., and the original change request can be compared to those prior change requests of the same category as the original change request.

For one embodiment, methods of mitigating risk facilitate suggesting modifications of the change request to a user based on two dimensions: 1) comparing the risk of the selected change request to its similar change requests (e.g., if the current implementer of the change request has a low success rate in similar changes, and there is a different implementer for similar change requests that has a higher success rate, the system can suggest the alternative implementer); and 2) analyzing specific factors and providing alternative values where comparison to similar change requests is not relevant (e.g., if a collision is expected due to the change request schedule, the system can suggest a different time frame to implement the change in which the change request will not collide with other change request implementations).

The trigger for reducing the level of risk can be automatic, i.e., once a composite risk level of a change request passes above a particular threshold value (some defined value within the range of possible values resulting from the risk assessment), the system will notify the user on possible actions to reduce the risk of the change request. Alternatively, the trigger for reducing the level of risk can be manual, i.e., during the change request assessment process the user is performing on a change, the user may request the system to suggest modifications for the change request that will reduce the risk.

The process of creating the suggestions is described in the following pseudo code:

```
Assume CR is the analyzed change request
Loop through risk factor in factors list (FL) {
    If (FL_i is relevant to compare to similar changes) {
        Loop through similar changes list (SL) {
            If FL_i value for CR is higher than for SL_i {
                Add the value from SL_i as an alternative value to CR
            }
        }
    } else {
        Activate the factor specific logic for reducing risk
    }
}
Display to the user the list of alternative values.
Where:  CR is the original change request
        FL is the risk factors list for CR
        FL_i is the i^th risk factor of CR
        SL is the list of similar change requests
        SL_i is the i^th risk factor of a given similar change request
```

Table 4 provides examples of risk factors that might be used with embodiments of the disclosure. Change requests evaluated using embodiments of this disclosure may define one or more risk factors, such as those listed in Table 4 as well as additional or alternative risk factors. In general, a user may define any number of risk factors to be considered provided that at least one is relevant to compare to a prior change request. Risk factors that are not generally relevant to compare, e.g., whether QA approval has been given, whether the change was tested in a testing environment, whether a collision is expected, etc., may either be ignored for purposes of risk mitigation, or they may be evaluated using factor specific logic to identify an alternative value. For example, if a collision is expected, e.g., overlap of hardware, implementers or configuration items between two concurrent or adjacent change requests, the factor specific logic may suggest a different time frame in which to perform the change request that will not produce a collision.

TABLE 4

| Risk Factor Name | Description |
| --- | --- |
| collisions-severity | Indicates whether collision is expected and its severity |
| QA-approval | Indicates whether this change been given a QA approval |
| num-of-CCIs | Indicates a number of changed configuration items (CCIs) involved in the change |
| planned-duration | Indicates the planned duration of the change |
| DA-business-CIs | Indicates accumulated importance of directly affected (DA) business configuration items (CIs) |
| IDA-business-CIs | Indicates accumulated importance of indirectly affected (IDA) business CIs |
| changed-ci-list | The list of CIs that are part of the planned change |
| departments-involved | Indicates the number of different departments from which the change implementers emanate |
| implementer-experience | Indicates the implementer's level of experience regarding the work involved in the change |
| involved-users | Indicates the number of users using the business CIs involved in the change |
| is-backout-possible | Indicates whether there is a valid backout plan |
| is-outage-planned | Indicates whether a controlled outage is planned as part of the change |
| is-SOX-app-involved | Indicates whether a Sarbanes-Oxley (SOX) application is involved in the change |
| is-tested | Indicates whether the change was tested in a testing environment |
| new-deployment | Indicates whether the change is a deployment of new hardware, a major feature, or an application |
| past-experience | Indicates the success ratio of similar changes in the past |
| recent-incidents | Indicates whether a business CI involved in the change had major incidents within the two previous weeks |
| site-location | Indicates the location of the site where the change will take place |
| sla-status | Indicates whether the service level agreement (SLA) of a business CI involved in the change is close to being breached |
| technology-experience | The amount of time (in quarters) that has transpired since the technology involved in the change was introduced to the organization |
| vip-users | Indicates whether there are any VIP users using business CIs involved in the change |

Figure 2:
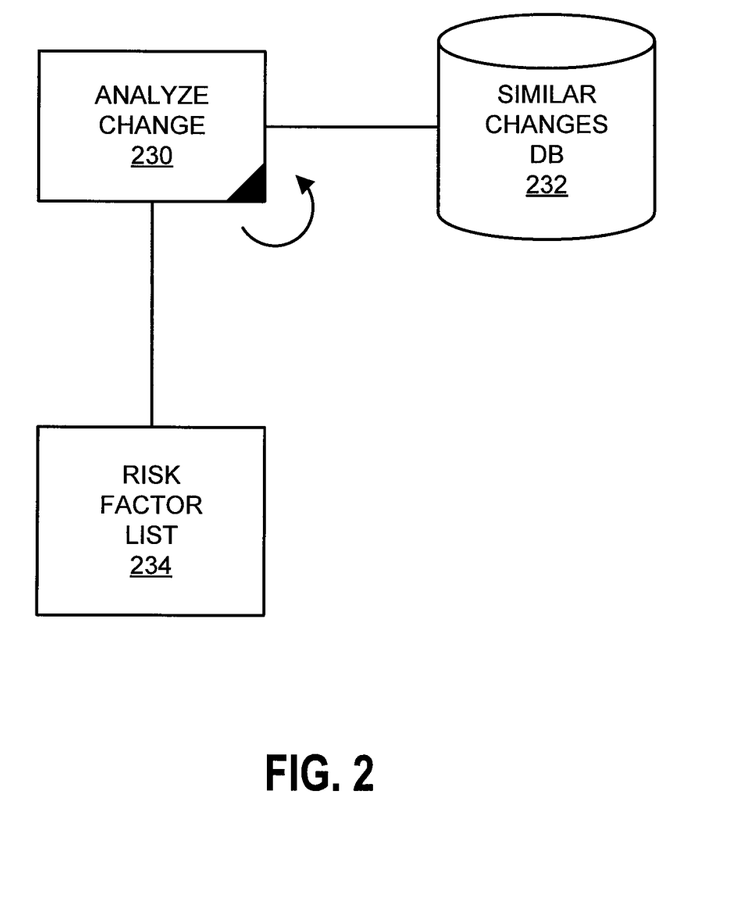
FIG. 2 is a symbolic representation of a method of mitigating risk in accordance with one embodiment of the disclosure.

FIG. 2 is a symbolic representation of a method of mitigating risk in accordance with one embodiment of the disclosure. In FIG. 2, a risk factor list 234 of the original change request is compared to a database 232 of similar changes. The risk factor list 234 includes the quantitative level of risk for each or one or more factors defined by the original change request. The quantitative level of risk for each of the one or more factors in the risk factor list 234 is then analyzed for change 230 by comparing them to the same risk factors found in historical change requests in the similar changes database 232. When a level of risk of a risk factor in a similar change request is determined to be less than the level of risk of that risk factor of the original change request, the alternative factor value from the similar change request may be suggested as a modification to the original change request.

Figure 3:
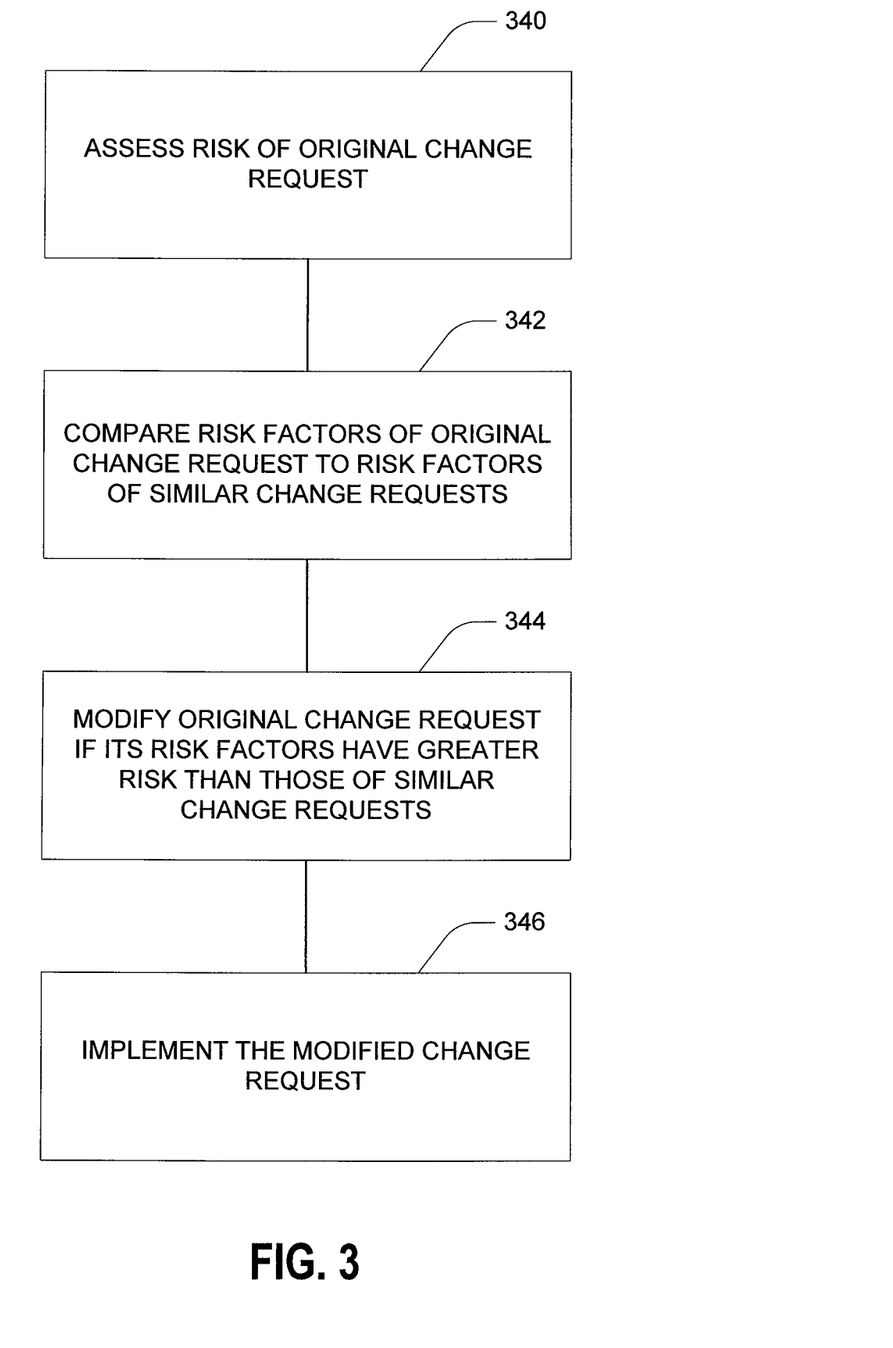
FIG. 3 is a flowchart of a method of mitigating risk in accordance with an embodiment of the disclosure.

FIG. 3 is a flowchart of a method of mitigating risk in accordance with an embodiment of the disclosure. At 340, the risk of the original change request is assessed. As such, a quantitative level of risk is assigned to each risk factor associated with the original change request. At 342, risk factors of the original change request are compared to the same risk factors of change requests similar to the original change request. At the extreme, a change request may be similar if it has at least one relevant risk factor in common with the original change request. However, as noted above, advantages may be obtained by seeking out higher levels of similarity, such as through the use of an adaptive similarity analysis or identification of like categories.

At 344, the original change request is modified if its risk factors have a higher level of risk than those of one or more of the similar change requests. This can be done through a comparison of a risk factor of the original change request with the same risk factor of a similar change request. If the quantitative level of risk assigned to the risk factor of the similar change request is less than the quantitative level of risk assigned to the risk factor of the original change request, the factor value of the risk factor of the similar change request may be suggested as an alternative value for the original change request. Optionally, if comparison of risk factors between the original change request and a similar change request is deemed to be not relevant, e.g., mitigation may be logically assessed without comparison to a list of similar change requests, an alternative value may be identified using logic specific to those risk factors. As one example, if the is-tested risk factor of the original change request indicates that no testing has been performed, an alternative value of performing testing may be suggested. A user can then weigh the reduction of risk against the time/cost of performing the testing to determine whether to implement the suggestion. One or more of the suggested values can then be used to modify the original change request, i.e., replacing a factor value of the original change request with a factor value suggested in response to the comparison. At 346, the modified change request is then implemented on the computer system.

Figure 4:
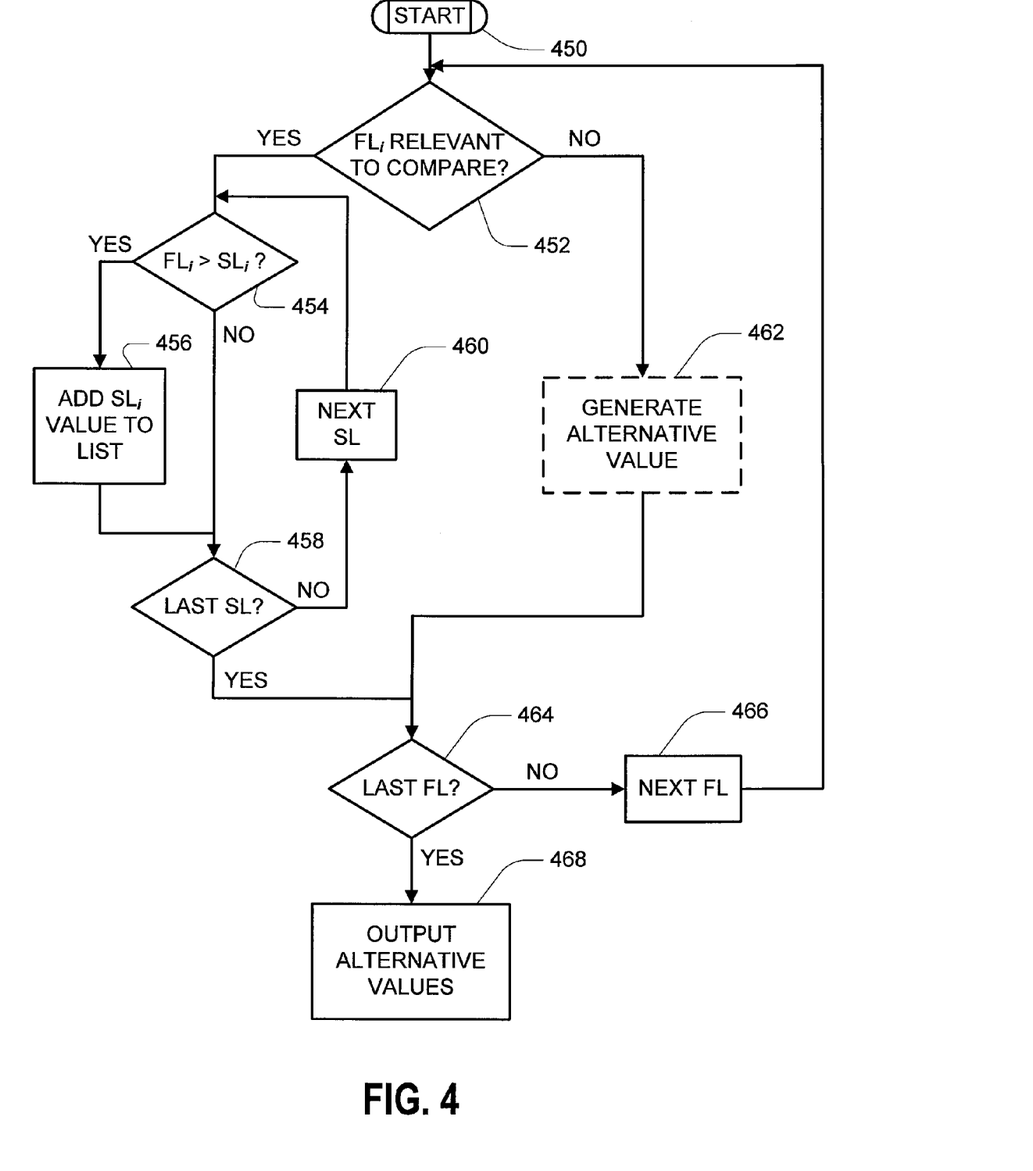
FIG. 4 is a flow chart of another method of mitigating risk in accordance with an embodiment of the disclosure.

FIG. 4 is a flow chart of another method of mitigating risk in accordance with an embodiment of the disclosure. The method starts at 450 with an original change request defined and similar change requests identified. The process then begins to loop through the risk factors of the original change request at 452. If an evaluated risk factor $FL_i$ of the original change request is deemed to be relevant to compare at 452, the method continues at 454. If the evaluated risk factor is deemed to be not relevant to compare at 452, the method proceeds to 462. In the various embodiments, a user may control which risk factors are deemed to be relevant to compare and which are not. At 462, the method may optionally generate an alternative value to add to a list of suggested modifications to the original change request using logic specific to the risk factor $FL_i$. However, embodiments may ignore risk factors that are deemed not relevant to compare and may proceed directly to 464 without evaluating any factor specific logic.

At 454, the method begins a loop to compare the evaluated risk factor to the same risk factor $SL_i$ of one or more similar change requests. If the evaluated risk factor $FL_i$ has a level of risk that is greater than the level of risk of the risk factor $SL_i$, of a similar change request, the method proceeds to 456 where the value of the risk factor $SL_i$, is added to a list of suggested modifications to the original change request, then the method proceeds to 458. For one embodiment, only one factor value of risk factor $SL_i$ is added to the list of suggested modifications for any given risk factor $FL_i$. For example, the list may be limited to the risk factor $SL_i$, having the lowest level of risk of any of the similar change requests. If the evaluated risk factor $FL_i$ has a level of risk that is less than or equal to the level of risk of the risk factor $SL_i$ of the similar change request, the method proceeds to 458 without adding any alternative values to the list of suggested modifications. At 458, a decision is made as to whether there are additional similar change requests to evaluate against the risk factor $FL_i$. If additional similar change requests are available, the method proceeds to 460 to get the level of risk of the risk factor $SL_i$, of the next similar change request for comparison at 454. If all of the identified similar change requests have been evaluated against the risk factor $FL_i$, the method proceeds to 464.

At 464, a decision is made as to whether there are additional risk factors of the original change request to consider. If additional risk factors $FL_i$ are available, the method proceeds to 466 to get the level of risk of the next risk factor $FL_i$ for evaluation at 450. If all of the risk factors of the original change request have been evaluated at 464, the method proceeds to 468 where a list of suggested changes, i.e., alternative values for risk factors of the original change request, are provided as output. The output may be a simple list of suggested changes that are expected to provide some mitigation of risk. For an alternative embodiment, the output may include an indication of an expected probability of failure of one or more possible modifications to the original change request to provide additional guidance to the user as to what changes should be implemented. For a still further embodiment, the output may provide a set of suggested modifications that are expected to produce the highest level of mitigation of risk over the original change request.

Figure 5:
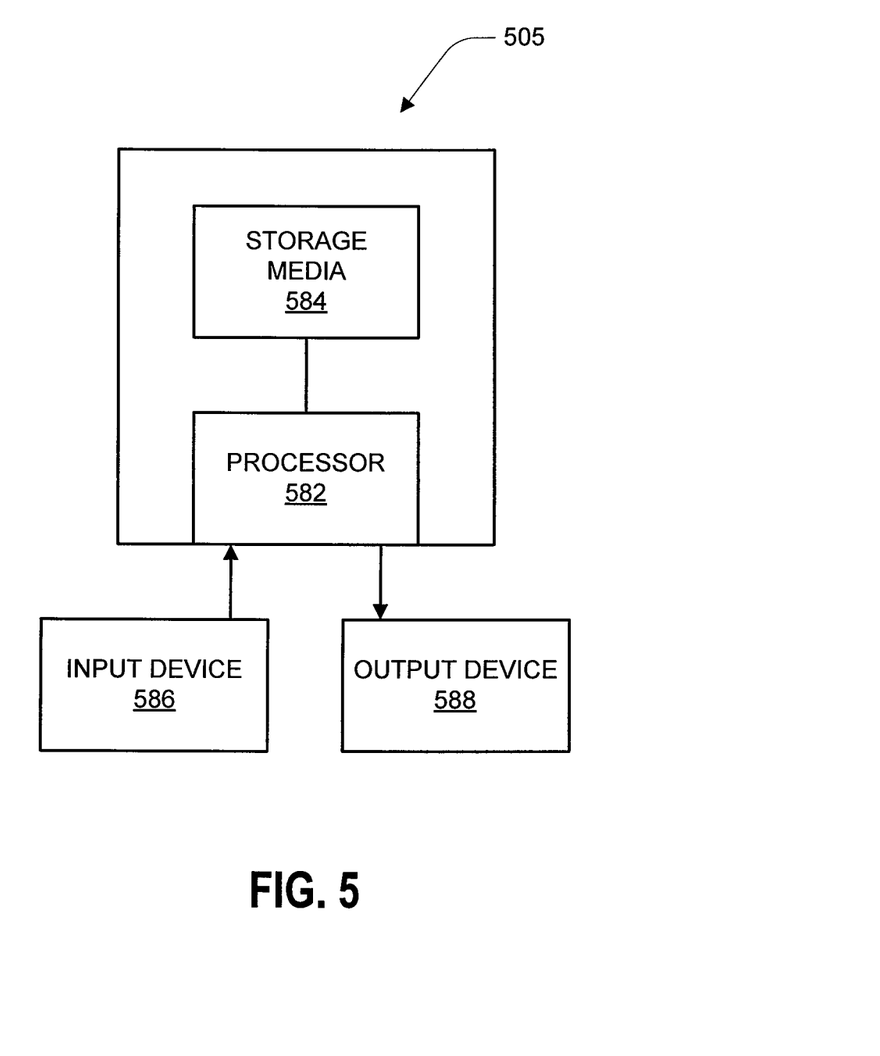
FIG. 5 is a block diagram of a computing device for use with various embodiments of the disclosure.

FIG. 5 is a block diagram of a computing device 505 for use with various embodiments of the disclosure. The computing device 505 has been simplified to focus on aspects relevant to the various embodiments. The computing device 505 includes a processor 582 in communication with storage media 584. The storage media 584 may represent one or more fixed or removable storage media, such as hard drives, volatile or non-volatile memory, optical drives, etc. The storage media 584 contains machine-readable instructions adapted to cause the processor 582 to perform one or more methods of the various embodiments. The storage media 584 may further contain the database of similar change requests. Alternatively, the database of similar change requests may be located in a device external to the computing device 505 (not shown in FIG. 5).

The computing device 505 further includes one or more input devices 586, e.g., a computer keyboard, pointing device or the like, to enter the information of the original change request and to provide other user input. The computing device 505 further includes one or more output devices 588, e.g., a monitor, printer, communication port or the like, to provide feedback and output to a user. Computing device 505 may be a single-device computer system. Alternatively, computing device 505 may be one computing device of a networked computer system, e.g., a server 105 of computer system 100 of FIG. 1. The computing device 505 may perform methods in accordance with embodiments of the disclosure for change requests pertaining to the computer system that contains computing device 505, or it may perform methods in accordance with embodiments of the disclosure for change requests pertaining to a computer system that does not contain computing device 505.

What is claimed is:

1. A method of mitigating risk of change implementation in a computer system, comprising:
  assessing a level of risk of a risk factor of an original change request for the computer system by a processor;

comparing, by the processor, the level of risk of the risk factor of the original change request to a level of risk of a corresponding risk factor of at least one prior change request having at least one risk factor corresponding to a risk factor of the original change request, wherein the at least one prior change request is contained in a non-transitory storage media in communication with the processor;

modifying the original change request if the level of risk of the risk factor of the original change request is greater than the level of risk of the corresponding risk factor of any of the at least one prior change requests; and implementing the modified change request on the computer system.

2. The method of claim 1, wherein the original change request comprises a request to add, remove or modify at least one software application, hardware component or device of the computer system.

3. The method of claim 1, further comprising:

assessing a level of risk of a second risk factor of the original change request for the computer system; and applying logic specific to the second risk factor to suggest a modification to the second risk factor of the original change request without comparing to a risk factor of the at least one prior change request.

4. The method of claim 1, further comprising:

identifying the at least one prior change request having at least one risk factor corresponding to a risk factor of the original change request from a database of historical change requests.

5. The method of claim 4, wherein identifying the at least one prior change request comprises at least one act selected from the group consisting of applying an adaptive similarity analysis to the database of historical change requests, and identifying change requests from the database of historical change requests having a same category as the original change request.

6. The method of claim 1, further comprising:

assessing a level of risk of each risk factor of an original change request for the computer system;

comparing the level of risk of each risk factor of a first set of risk factors of the original change request to a level of risk of the corresponding risk factors of at least one prior change request having at least one risk factor corresponding to a risk factor of the original change request;

modifying the original change request if the level of risk of any risk factor of the first set of risk factors is greater than the level of risk of the corresponding risk factor of any of the at least one prior change requests; and for a second set of risk factors of the original change request, applying logic specific to each risk factor of the second set of risk factors to suggest a modification to the original change request;

wherein the first set of risk factors and the second set of risk factors are mutually exclusive.

* * * * *